(12) United States Patent
Maeno et al.

(10) Patent No.: US 11,054,733 B2
(45) Date of Patent: Jul. 6, 2021

(54) LIGHT SOURCE DEVICE

(71) Applicant: JVCKENWOOD Corporation, Yokohama (JP)

(72) Inventors: Keiichi Maeno, Yokohama (JP); Tadashi Furukawa, Yokohama (JP); Takatsugu Aizaki, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/993,385

(22) Filed: Aug. 14, 2020

(65) Prior Publication Data

US 2021/0055644 A1    Feb. 25, 2021

(30) Foreign Application Priority Data

Aug. 23, 2019    (JP) .............................. JP2019-152559

(51) Int. Cl.
*G03B 21/20*    (2006.01)
*G02B 26/00*    (2006.01)

(52) U.S. Cl.
CPC ....... *G03B 21/2066* (2013.01); *G03B 21/204* (2013.01); *G02B 26/008* (2013.01); *G03B 21/208* (2013.01)

(58) Field of Classification Search
None
See application file for complete search history.

(56) References Cited

FOREIGN PATENT DOCUMENTS

JP    2017-156403 A    9/2017

*Primary Examiner* — Vip Patel
(74) *Attorney, Agent, or Firm* — Nath, Goldberg & Meyer; Jerald L. Meyer

(57) ABSTRACT

A light source device includes a blue laser light module that emits a blue laser light, and a dichroic mirror including an incident surface, and that reflects the incident blue laser light in a second direction different from a first direction which is an emission direction of the blue laser light so as to introduce the blue laser light into a fluorescent body, and allow part of light excited by the fluorescent body and emitted in a direction opposite to the second direction to penetrate through the dichroic mirror. The incident surface is provided with a dichroic coat region coated with a dichroic coat so as to reflect the blue laser light, and the dichroic coat region is formed on the incident surface such that a length in a direction orthogonal to the first direction is longer as a distance from the blue laser module is farther.

3 Claims, 4 Drawing Sheets

LIGHT SOURCE DEVICE

CROSS REFERENCE TO RELATED APPLICATION

This application is based upon and claims the benefit of priority under 35 U.S.C. § 119 from Japanese Patent Application No. 2019-152559 filed on Aug. 23, 2019, the entire contents of which are incorporated herein by reference.

BACKGROUND

The present disclosure relates to a light source device used for a device such as a projector.

Japanese Unexamined Patent Application Publication No. 2017-156403 (referred to below as Patent Literature 1) discloses a light source device used for a device such as a projector. Patent Literature 1 discloses that a blue excitation light emitted from a laser light source is reflected by a dichroic mirror to be radiated to a fluorescent plate, and the light excited by the fluorescent plate is caused to penetrate through the dichroic mirror.

The light source device disclosed in Patent Literature 1 includes a plurality of excitation light reflection parts in the dichroic mirror at which the blue excitation light emitted from the laser light source is reflected so as to cause the reflected blue excitation light to be led to the fluorescent plate.

SUMMARY

The light source device disclosed in Patent Literature 1 provided with the plural excitation light reflection parts, however, increases in the number of the boundaries between the excitation light reflection parts and light penetration parts, which may cause a reduction in reflection efficiency of light at the boundaries. The reason for the reduction in reflection efficiency at the boundaries is that, for example, a dichroic coat for the excitation light reflection parts cannot be formed by vapor deposition as designed at the boundaries because of an influence of shading by a mask used for the vapor deposition.

An aspect of one more embodiments provides a light source device including a blue laser light module configured to emit a blue laser light, and a dichroic mirror including an incident surface having a flat shape, and configured to reflect the incident blue laser light in a second direction different from a first direction which is an emission direction of the blue laser light so as to introduce the blue laser light into a fluorescent body, and allow part of light excited by the fluorescent body and emitted in a direction opposite to the second direction to penetrate through the dichroic mirror. The incident surface of the dichroic mirror is provided with a dichroic coat region coated with a dichroic coat so as to reflect the blue laser light, and the dichroic coat region is formed on the incident surface such that a length in a direction orthogonal to the first direction is longer as a distance from the blue laser module is farther.

DETAILED DESCRIPTION

Figure 1:
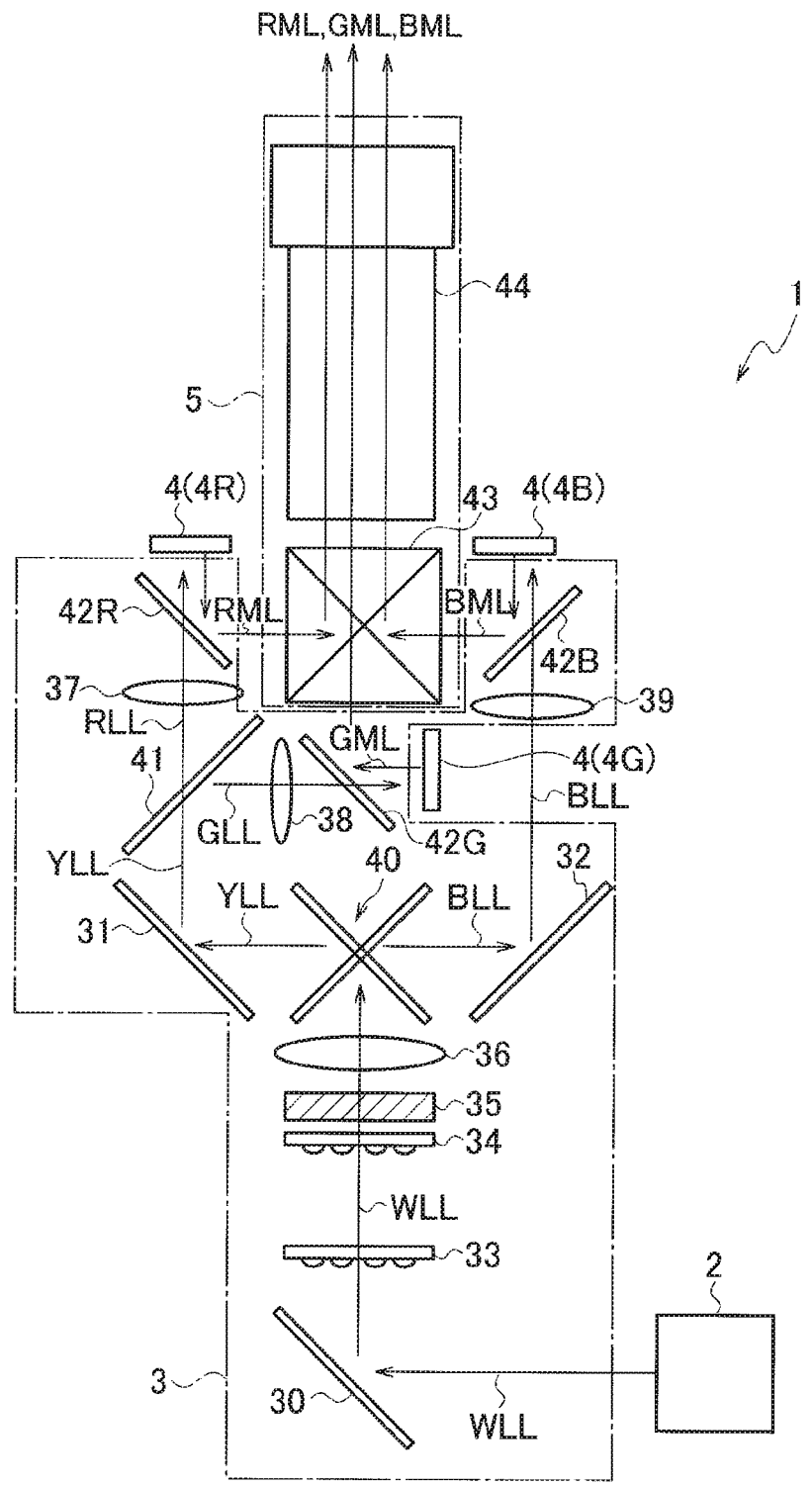
FIG. 1 is a view illustrating a configuration of a projection device in which a light source device according to one or more embodiments is installed.
Figure 2:
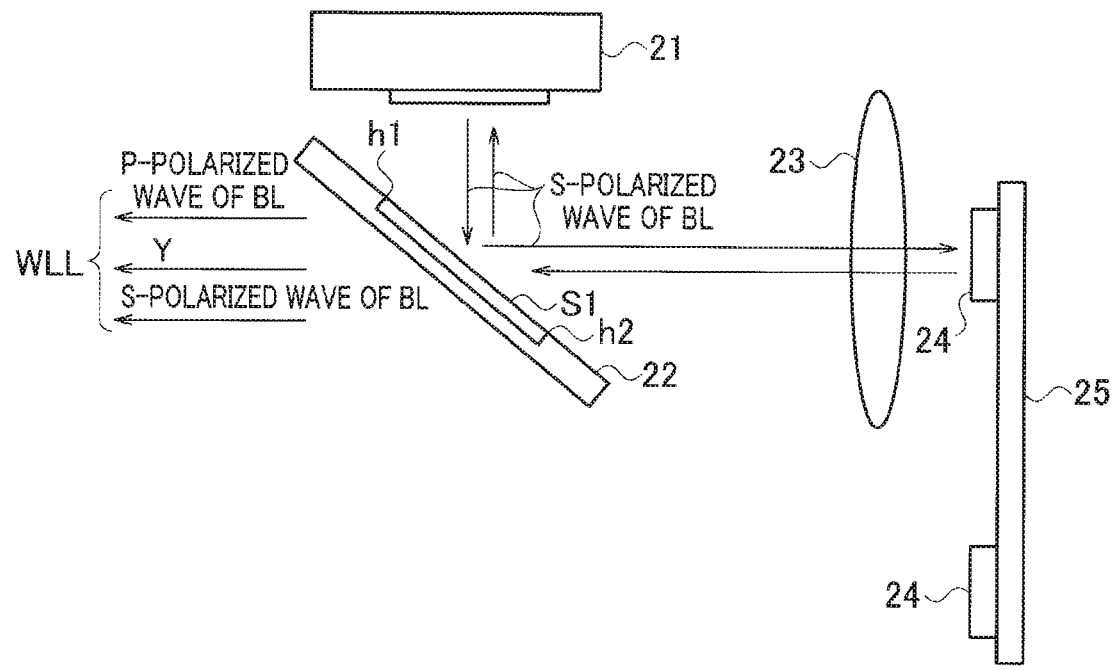
FIG. 2 is a view illustrating a specific configuration of the light source device according to one or more embodiments.

Hereinafter, a light source device according to one or more embodiments will be described with reference to the accompanying drawings. FIG. 1 is a view illustrating a configuration of a projection device in which the light source device according to one or more embodiments is installed. FIG. 2 is a view illustrating a specific configuration of the light source device. As shown in FIG. 1, the projection device 1 according to one or more embodiments includes the light source device 2, an illumination optical system 3, light modulation elements 4 (4R, 4G, and 4B), and a projection optical system 5.

As shown in FIG. 2, the light source device 2 includes a blue laser module 21 that emits a blue laser light BL of an S-polarized wave, a dichroic mirror 22 arranged on a radiation path of the blue laser light BL to be emitted, a condensing lens 23 that condenses the blue laser light BL reflected by the dichroic mirror 22, a phosphor wheel 25, and a fluorescent body 24.

Figure 3:
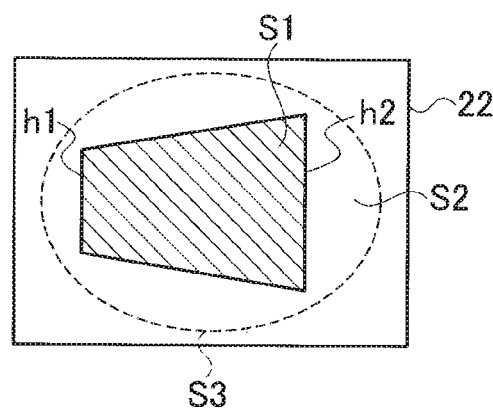
FIG. 3 is a view illustrating a dichroic coat region and a penetration region provided on an incident surface of a dichroic mirror according to one or more embodiments.

FIG. 3 is a view illustrating a configuration of an incident surface of the dichroic mirror 22. As illustrated in FIG. 3, the dichroic mirror 22 has the incident surface with a flat shape. The incident surface of the dichroic mirror 22 is provided with a trapezoidal dichroic coat region S1 coated with a dichroic coat, and a penetration region S2 without the dichroic coat. The dichroic coat region S1 selectively reflects light in a predetermined wavelength range, which is the blue laser light of the S-polarized wave in one or more embodiments, and allows other light to penetrate through the dichroic mirror 22. The penetration region S2 is a region through which the incident light penetrates.

The emission direction of the blue laser light BL emitted from the blue laser module 21 (the downward direction in FIG. 2) is defined as a first direction. The incident surface of the dichroic mirror 22 is inclined at 45 degrees to the first direction. One or more embodiments exemplify the case of the incident surface inclined at 45 degrees, but are not intended to be limited to this case. The incident direction is only required to be different from the reflection direction.

As shown in FIG. 3, a short side h1 of the trapezoidal dichroic coat region S1 (a shorter one of the two sides parallel to each other) is arranged on the side closer to the blue laser module 21, and a long side h2 is located on the other side away from the blue laser module 21. Namely, the dichroic coat is formed on the incident surface of the dichroic mirror 22 such that the length in a direction orthogonal to the first direction is longer as a distance from the blue laser module 21 is farther.

The blue laser light BL of the S-polarized wave entering in the first direction is reflected by the dichroic coat region S1 at 90 degrees, and is then introduced to the fluorescent body 24 after being condensed by the condensing lens 23.

The reflected direction of the blue laser light BL (the rightward direction in FIG. 2) is defined as a second direction.

The phosphor wheel 25 for supporting the fluorescent body 24 has a disc-like shape, for example. The fluorescent body 24 is arranged along the outer circumference of the front surface which is a mirror surface of the phosphor wheel 25. The fluorescent body 24, when irradiated with the blue laser light BL, is excited so as to emit a yellow light (Y) including a red component and a green component. The fluorescent body 24 reflects a blue light. The reflected blue light, which is scattered by the fluorescent body 24, includes the S-polarized wave and the P-polarized wave.

The fluorescent body 24 is irradiated with the blue laser light BL while the phosphor wheel 25 is rotating, so as to disperse a local increase in temperature in the fluorescent body 24 caused by the irradiation with the blue laser light BL toward the entire outer circumference of the phosphor wheel 25. The increase in temperature of the fluorescent body 24 thus can be reduced.

The yellow light and the blue light emitted from the fluorescent body 24 enter the incident surface of the dichroic mirror 22 in the direction opposite to the second direction (the leftward direction in FIG. 2). The yellow light and the blue light are introduced to an oval region S3 shown in FIG. 3, for example. The blue light of the S-polarized wave introduced to the dichroic coat region S1 in the oval region S3 is reflected by the dichroic coat region S1 so as to be radiated in the direction opposite to the first direction. The dichroic coat region S1 has a smaller size than the oval region S3 irradiated with the light excited by the fluorescent body 24.

The light introduced to the penetration region S2 in the oval region S3 and the light penetrating through the dichroic coat region S1 (the yellow light and the blue light (the P-polarized wave and the S-polarized wave)) are introduced to the illumination optical system 3 shown in FIG. 1 as illumination light WLL.

As described above, the dichroic mirror 22 having the flat incident surface reflects the incident blue laser light in the second direction different from the first direction which is the emission direction of the blue laser light so as to introduce the reflected blue laser light to the fluorescent body 24. The dichroic mirror 22 also allows part of the light excited by the fluorescent body 24 and emitted in the direction opposite to the second direction to penetrate therethrough.

Returning to FIG. 1, the illumination optical system 3 includes reflection mirrors 30, 31, and 32, fly-eye lenses 33 and 34, a polarization conversion element 35, and lenses 36 to 39. The illumination optical system 3 further includes a cross dichroic mirror 40, a dichroic mirror 41, and reflection polarization plates 42 (indicated by 42R, 42G, and 42B in FIG. 1).

The reflection mirror 30 reflects the illumination light WLL entering the illumination optical system 3 toward the fly-eye lenses 33 and 34. The fly-eye lenses 33 and 34 equalize an illumination distribution of the illumination light WLL to be emitted to the light modulation elements 4.

The polarization conversion element 35 causes the illumination light WLL to conform to either a P-polarized light or an S-polarized light. The polarization conversion element 35 causes the illumination light WLL to conform to the S-polarized light, for example. The illumination light WLL caused to conform to the S-polarized light enters the cross dichroic mirror 40 via the lens 36. The cross dichroic mirror 40 separates the illumination light WLL into a yellow illumination light YLL and a blue illumination light BLL.

The yellow illumination light YLL separated by the cross dichroic mirror 40 is reflected by the reflection mirror 31 to enter the dichroic mirror 41. The dichroic mirror 41 further separates the yellow illumination light YLL into a red illumination light RLL including a red component and a green illumination light GLL including a green component.

The dichroic mirror 41 allows the red illumination light RLL to penetrate, while reflecting the green light GLL. The reflection polarization plate 42 allows one of the P-polarized light and the S-polarized light to penetrate, while reflecting the other polarized light. The reflection polarization plate 42 allows the S-polarized light to penetrate, and reflects the P-polarized light, for example. The reflection polarization plate 42 can be a wire grid, for example.

For distinguishing the light modulation elements 4 and the reflection polarization plates 42 by color, the light modulation element 4 and the reflection polarization plate 42 irradiated with the red illumination light RLL are respectively referred to as a light modulation element 4R and a reflection polarization plate 42R. Similarly, the light modulation element 4 and the reflection polarization plate 42 irradiated with the green illumination light GLL are respectively referred to as a light modulation element 4G and a reflection polarization plate 42G, and the light modulation element 4 and the reflection polarization plate 42 irradiated with the blue illumination light BLL are respectively referred to as a light modulation element 4B and a reflection polarization plate 42B.

The red illumination light RLL penetrating the dichroic mirror 41 enters the reflection polarization plate 42R via the lens 37. The red illumination light RLL of the P-polarized light penetrates the reflection polarization plate 42R to be led to the light modulation element 4R. The light modulation element 4R subjects the red illumination light RLL to light modulation per pixel in accordance with image data of the red component so as to generate a red image light RML of the S-polarized light. The red image light RML is reflected by the reflection polarization plate 42R to enter the projection optical system 5.

The green illumination light GLL reflected by the dichroic mirror 41 enters the reflection polarization plate 42G via the lens 38. The green illumination light GLL of the P-polarized light penetrates the reflection polarization plate 42G to be led to the light modulation element 4G. The light modulation element 4G subjects the green illumination light GLL to light modulation per pixel in accordance with image data of the green component so as to generate a green image light GML of the S-polarized light. The green image light GML is reflected by the reflection polarization plate 42G to enter the projection optical system 5.

The blue illumination light BLL separated by the cross dichroic mirror 40 is reflected by the reflection mirror 32 to enter the reflection polarization plate 42B via the lens 39. The blue illumination light BLL of the P-polarized light penetrates the reflection polarization plate 42B to be led to the light modulation element 4B. The light modulation element 4B subjects the blue illumination light BLL to light modulation per pixel in accordance with image data of the blue component so as to generate a blue image light BML of the S-polarized light. The blue image light BML is reflected by the reflection polarization plate 42B to enter the projection optical system 5.

The projection optical system 5 includes a color combining prism 43 and a projection lens 44. The red image light RML, the green image light GML, and the blue image light BML are combined by the color combining prism 43, and are enlarged and projected to a target medium such as a screen as a full-colored display image by the projection lens 44.

Operations of One or More Embodiments

Figure 4:
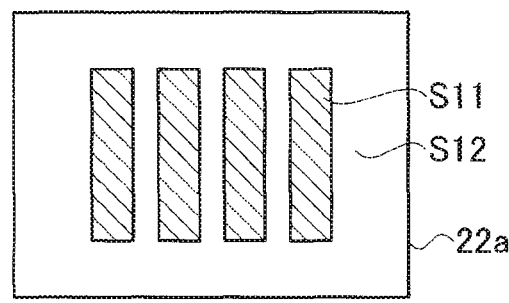
FIG. 4 is a view illustrating dichroic coat regions and a penetration region provided on an incident surface of a dichroic mirror of a comparative example.
Figure 5:
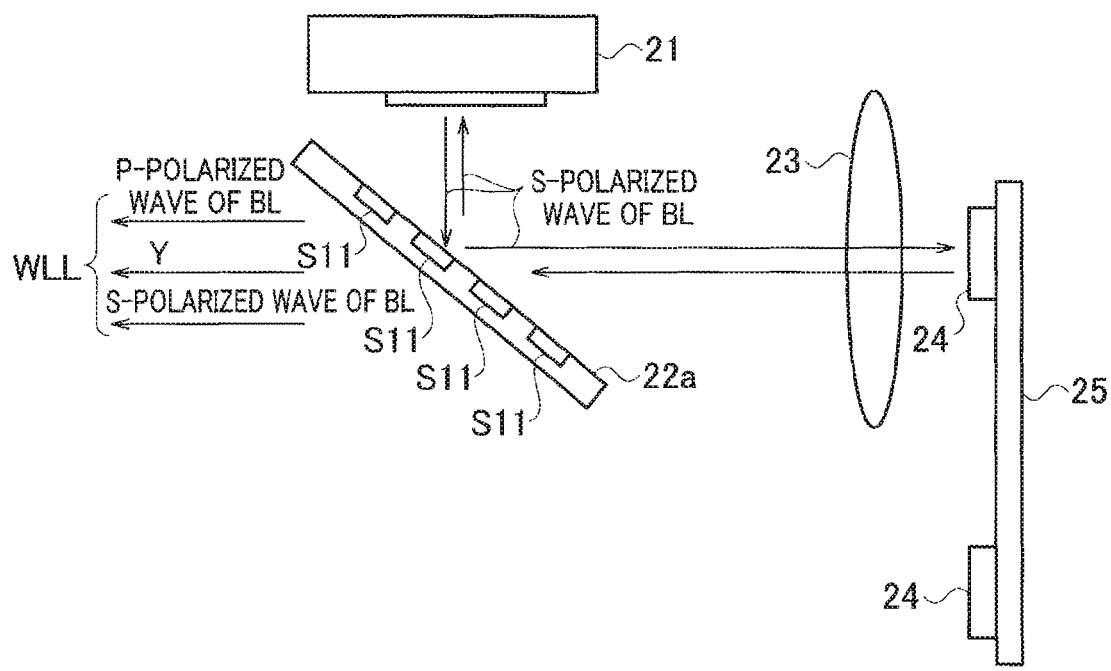
FIG. 5 is a view illustrating a configuration of a light source device using the dichroic mirror of the comparative example.

The operations of the light source device 2 installed in the projection device 1 configured as described above are described below. FIG. 4 is a view illustrating a structure of the incident surface of the dichroic mirror illustrated in FIG. 2 provided with a plurality of dichroic coat regions S11 formed into rectangular strips (a structure of a conventional dichroic mirror). FIG. 5 is a view illustrating a path of a light in the projection device using the dichroic mirror shown in FIG. 4.

As shown in FIG. 4, the dichroic coat regions S11 separately arranged into the plural strips increase in the number of the sides as boundaries between the dichroic coat regions S11 and a penetration region S12, which reduces a reflection efficiency of the light at the respective boundaries.

In contrast, in one or more embodiments, the provision of the single dichroic coat region S1 having the trapezoidal shape as illustrated in FIG. 3, can decrease the number of the boundaries between the dichroic coat region S1 and the penetration region S2 to avoid a reduction in reflection efficiency. This configuration can further enhance the performance of separation between the S-polarized wave and the P-polarized wave.

In addition, as illustrated in FIG. 3, the short side h1 of the trapezoid is arranged on the side closer to the blue laser module 21, while the long side h2 of the trapezoid is arranged on the other side away from the blue laser module 21. This configuration increases the area in which the blue laser light BL is reflected at the position distant from the blue laser module 21. The blue laser light emitted from the blue laser module 21 and slightly spreading before reaching the reflection surface, thus can be reflected uniformly toward the fluorescent body 24.

Effects of One or More Embodiments

As described above, the light source device 2 according to one or more embodiments is provided with the trapezoidal dichroic coat region S1 on the incident surface of the dichroic mirror 22. The trapezoidal shape on the incident surface is formed such that the length in the direction orthogonal to the first direction is longer as the distance from the blue laser module 21 is farther.

The dichroic mirror 22 thus can lead the blue laser light BL of the S-polarized wave emitted from the blue laser module 21 to be reflected in the second direction so as to uniformly introduce the blue laser light BL to the fluorescent body 24. This can stably excite the fluorescent body 24 to generate the yellow light.

The trapezoidal shape of the dichroic coat region S1 enables the yellow light and the blue light emitted in the direction opposite to the second direction to penetrate the dichroic mirror 22 efficiently so as to be introduced to the illumination optical system 3.

Modified Examples

Figure 6A:
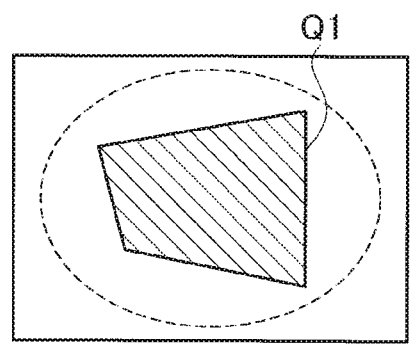
FIG. 6A is a view illustrating a configuration of dichroic mirrors according to a modified example.
Figure 6B:
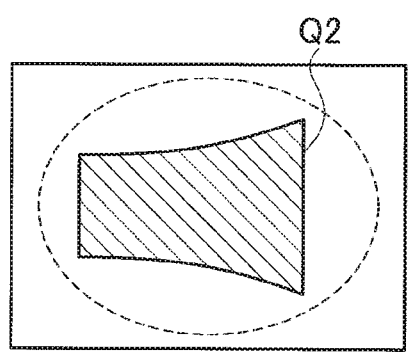
FIG. 6B is a view illustrating a configuration of dichroic mirrors according to another modified example.

While one or more embodiments have been illustrated above with the case in which the dichroic coat region S1 has the trapezoidal shape, various modifications can be made without limitation to this case. For example, the dichroic coat region may have a rectangular shape Q1 other than the trapezoidal shape as shown in FIG. 6A, or may have a shape Q2 having curved sides as shown in FIG. 6B.

Namely, the dichroic coat region S1 is only required to be formed on the incident surface such that the length in the direction orthogonal to the first direction is longer as the distance from the blue laser module 21 is farther (as the side is closer to the reference sign h2 shown in FIG. 3).

While one or more embodiments have been described above, it should be understood that the present disclosure is not intended to be limited to the descriptions and the drawings composing part of the present disclosure. Various alternative embodiments, examples, and technical applications will be apparent to those skilled in the art according to this disclosure.

For example, while one or more embodiments have been illustrated above with the blue laser module 21 that emits the blue laser light of the S-polarized wave, the blue laser module 21 may emit the blue laser light of the P-polarized wave.

The light source device 2 according to one or more embodiments can improve the reflection efficiency of light.

What is claimed is:

1. A light source device comprising:
a blue laser light module configured to emit a blue laser light; and
a dichroic mirror including an incident surface having a flat shape, and configured to reflect the incident blue laser light in a second direction different from a first direction which is an emission direction of the blue laser light so as to introduce the blue laser light into a fluorescent body, and allow part of light excited by the fluorescent body and emitted in a direction opposite to the second direction to penetrate through the dichroic mirror,
wherein the incident surface of the dichroic mirror is provided with a dichroic coat region coated with a dichroic coat so as to reflect the blue laser light, and
the dichroic coat region is formed on the incident surface such that a length in a direction orthogonal to the first direction is longer as a distance from the blue laser module is farther.

2. The light source device according to claim 1, wherein the dichroic coat region formed on the dichroic mirror is smaller than a region to be irradiated with the light excited by the fluorescent body.

3. The light source device according to claim 1, wherein the dichroic coat is formed into a trapezoidal shape having a short side and a long side parallel to each other such that the long side is arranged on a side away from the blue laser module.

* * * * *